Oct. 25, 1966 R. C. STEEL 3,281,657
TEMPERATURE COMPENSATED WHEATSTONE BRIDGE CIRCUITS
Filed July 1, 1963 2 Sheets-Sheet 1

INVENTOR
Richard Crawford Steel
BY
Stevens, Davis, Miller & Mosher
ATTORNEYS

Oct. 25, 1966  R. C. STEEL  3,281,657
TEMPERATURE COMPENSATED WHEATSTONE BRIDGE CIRCUITS
Filed July 1, 1963  2 Sheets-Sheet 2

INVENTOR
Richard Crawford Steel
BY
Stevens, Davis, Miller & Mosher
ATTORNEYS

United States Patent Office 3,281,657
Patented Oct. 25, 1966

3,281,657
TEMPERATURE COMPENSATED WHEATSTONE BRIDGE CIRCUITS
Richard Crawford Steel, Crowborough, Sussex, England, assignor to Servomex Controls Limited, Crowborough, Sussex, England
Filed July 1, 1963, Ser. No. 291,835
Claims priority, application Great Britain, July 2, 1962, 25,268/62
6 Claims. (Cl. 323—75)

This invention relates to temperature compensation circuit arrangements and to devices, particularly transformers, for use in such circuit arrangements.

A particular field of use of the invention is for temperature compensation in voltage stabilizing circuit arrangements using a Wheatstone bridge fed by an input transformer.

It is known to measure or to stabilize the voltage of an alternating current by use of a non-linear resistance. For example, if a Wheatstone bridge has three arms comprising fixed resistances and the fourth arm includes a temperature-sensitive resistor, such as a thermistor or filament lamp, the bridge will balance only at one value of applied voltage. When a filament lamp is used, an applied voltage in excess of that providing balance of the bridge raises the temperature of the lamp filament and hence its resistance. The unbalanced bridge then provides an error signal output having a certain phase relationship to the applied voltage. If the applied voltage is below the balancing voltage, conversely the output error signal has the opposite phase relationship to the applied voltage.

Filament lamps are conveniently used in practical circuits of this kind except, however, that high-voltage lamps have the disadvantage of fragile filaments and also movement of the filament changes the voltage drop between its ends. To overcome these disadvantages, it is known practise to use a low-voltage lamp in a Wheatstone bridge circuit supplied by way of a step-down transformer.

However, this expedient introduces a further difficulty. The windings of a step-down transformer have a significant voltage drop due to the resistance of the copper wire. This voltage drop varies with the temperature of the transformer, both as the transformer heats up after being switched-on and with ambient temperature changes.

In practise, it has been found that this variation is the greatest source of temperature error in this form of voltage measuring or stabilizing circuit and that it far exceeds the error due to temperature change of the fixed resistances of the bridge or changes of the lamp resistance. In fact, the more compact and economical the transformer used, the greater is the error due to variation of winding resistance with temperature.

Accordingly, it is one object of this invention to provide a temperature compensation circuit arrangement for this form of voltage measuring and stabilizing circuit arrangement.

It is a further object of this invention to provide a special step-down input transformer for use in a temperature compensated voltage bridge measuring or stabilizing circuit arrangement.

Accordingly, the present invention provides a voltage-measuring circuit arrangement of the type comprising a Wheatstone bridge including a first temperature-sensitive resistance having a pair of input terminals supplied with an input voltage from a step-down input transformer and having a pair of output terminals for supplying an unbalance voltage said bridge being balanced for a predetermined value of said input voltage, having a second temperature-sensitive resistance formed thermally integrally with the step-down input transformer, included in a selected arm of the bridge and so dimensioned that bridge unbalance due to temperature change of the step-down input transformer is substantially compensated.

According to the further object of the invention, the second temperature-sensitive resistance is a further winding on the step-down input transformer, conveniently located intermediately of the primary and secondary windings thereof and conveniently formed by winding two copper wires side-by-side, connecting the one ends thereof together and the opposite ends thereof into the bridge circuit so that the winding is non-inductive and is subject to the same temperature changes as the input transformer windings.

In order that the invention may readily be carried into effect, alternative embodiments of circuit arrangement and a preferred embodiment of transformer will now be described in detail with reference to the accompanying drawings, in which.

Figure 1:
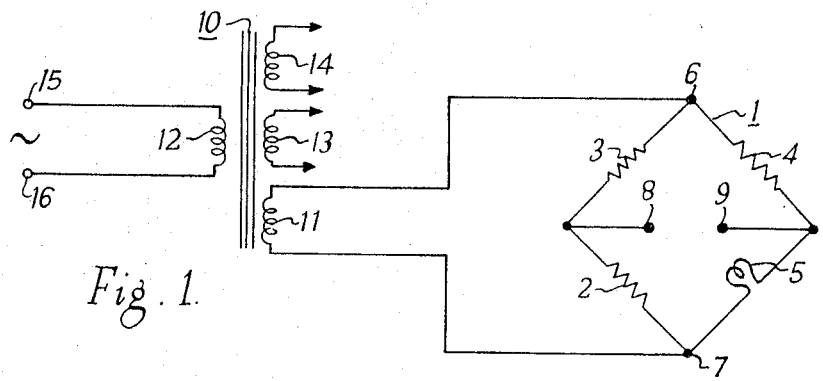
FIG. 1 is a circuit diagram showing the known type of voltage measuring circuit arrangement to which the invention relates.

FIG. 1 shows a voltage-measuring circuit arrangement of the type comprising a Wheatstone bridge shown generally at 1. In this example, the bridge 1 has three arms made up of ohmic resistances 2, 3 and 4 and a fourth arm comprising a low-voltage filament lamp 5.

The bridge 1 has a pair of input terminals 6 and 7 supplied from a low-voltage secondary winding 11 of a step-down input transformer shown generally at 10. The transformer 10 has a primary winding 12 and further secondary windings 13 and 14 connected to loads with which the present invention is not concerned.

The primary winding 12 is supplied at terminals 15 and 16 from an alternating current supply, in this example of 230 volts, 50 cycles/sec.

The bridge 1 has a pair of output terminals 8 and 9. The resistances 2, 3, 4 and 5 are dimensioned so that the bridge is balanced at a predetermined voltage applied to terminals 6 and 7. In this example, the bridge is balanced for the voltage of input winding 11 which corresponds to a voltage at terminals 15 and 16 of exactly 230 volts. Under these conditions, no output voltage appears between terminals 8 and 9.

If the input voltage rises above 230 volts, so also does the voltage at terminals 6 and 7 and the current through all arms of the bridge. In consequence, the filament temperature and resistance of lamp 5 rise, resulting in an unbalance of the bridge. A voltage then appears at terminals 8 and 9 which has a certain phase relationship to voltage at terminals 15 and 16. If the voltage at terminals 15 and 16 falls, the unbalance voltage at terminals 8 and 9 has the opposite phase relationship relatively to the over-voltage condition.

The output error voltage at terminals 8 and 9 may be used as a measure of the voltage at terminals 15 and 16 or may be applied to a control arrangement to maintain constant the voltage at terminals 15 and 16. Both arrangements are known and the present invention is not concerned with the form of such arrangements.

The required operation of the circuit of FIGURE 1 is impaired by temperature change of the transformer 10.

When the resistors 2, 3 and 4 are referred to as ohmic resistances, it must be accepted that they will be subject to some small change in value due to temperature changes. However, the effect on the operation of the circuit is small compared with that due to temperature change of the transformer 10. The change of value with temperature of resistances 2, 3 and 4 is, of course, negligible compared with that of the temperature-sensitive resistance 5.

It has been found that the stabilization control provided by the circuit may vary by several volts from the 230 volt nominal value, with rise in transformer temperature from room temperature to operation temperature.

A transformer designed to minimize this error would be an excessively expensive component. By contrast, an inexpensive transformer which, in the circuit of FIG. 1, would cause errors of some 5 volts in 230 volts, can be used satisfactorily in the circuit of FIG. 3 with an error of only about 0.2 volt in 230 volts.

Figure 2:
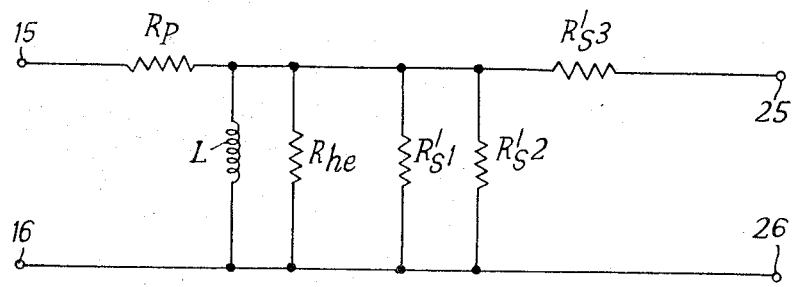
FIG. 2 is a diagram illustrating the equivalent electrical circuit of the step-down transformer of FIG. 1.

FIG. 2 represents the equivalent circuit of input transformer 10. Between the input terminals 15 and 16 and the output terminals 25 and 26 of the equivalent network is the series combination of a resistance $R_p$, representing the resistance of primary 12, and resistance $R'_{s3}$, representing the resistance of secondary 11. In parallel combination in the network is an inductance L, representing the primary and reflected secondary inductances, a resistance $R_{he}$, representing the iron loss, and resistances $R'_{s1}$ and $R'_{s2}$, representing the resistances of secondaries 13 and 14 and their loads.

It will be seen that increase in value of the copper loss resistances, particularly of the primary 12 and the secondary 11 supplying the bridge, result in a fall in voltage at terminals 25 and 26 relatively to that at terminals 15 and 16.

Figure 3:
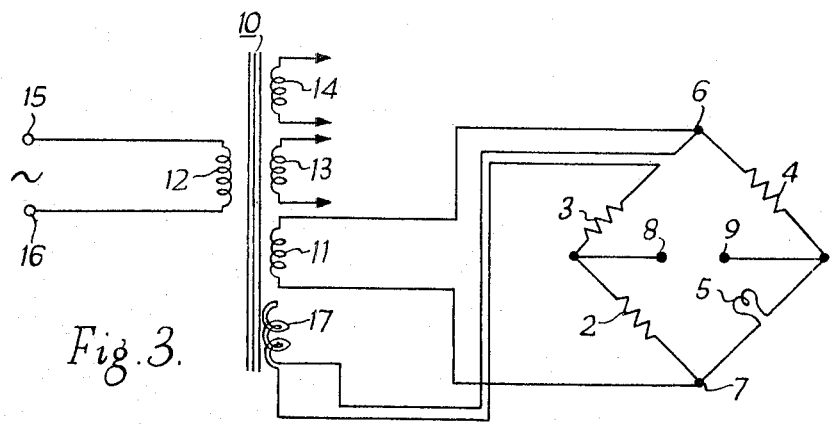
FIG. 3 is a circuit diagram of a temperature-compensated circuit arrangement according to the invention.

In FIG. 3, corresponding elements to those in FIG. 1 bear the same reference numerals. In the temperature-compensated circuit arrangement of FIGURE 3, a compensating resistance 17 is included in one arm of the Wheatstone bridge.

The resistance 17 is thermally integral with input transformer 10, that is, it is in intimate thermal contact with the transformer parts so that it takes up the same temperature.

Figure 6:
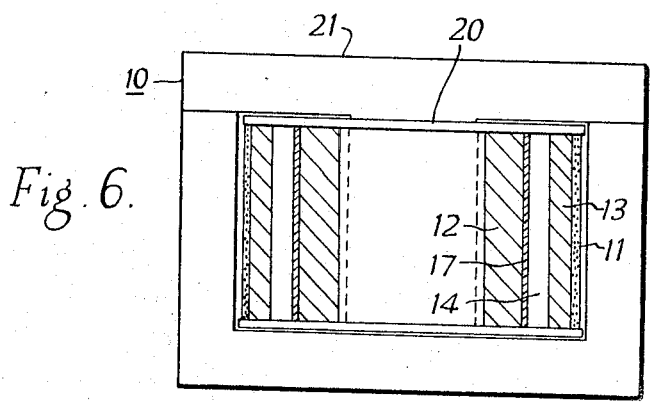
FIG. 6 is a section view of the step-down transformer of FIG. 3.

In the example shown in FIGS. 3 and 6, the resistance 17 is a non-inductive winding on the step-down input transformer 10. As shown in FIG. 6, the input transformer 10 comprises a bobbin 20 mounted in a core 21. The bobbin 20 contains five windings comprising primary 12, compensating winding 17 and secondaries 14, 13 and 11 viewed from inside to outside of the bobbin.

The winding 17 is formed by winding on a pair of copper wires simultaneously side by side. The inner ends of the wire pair are joined together and the outer ends are joined to convenient points for connection into the Wheatstone bridge arm in series with ohmic resistance 3.

Figure 4:
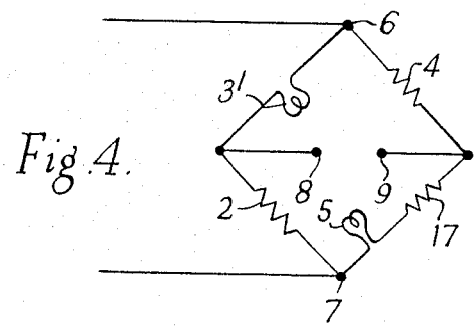
FIG. 4 shows an alternative bridge arrangement to that of FIG. 3.

FIG. 4 shows a variant of the Wheatstone bridge arrangement of FIG. 3. The ohmic resistances 2 and 4 are retained but the remaining two arms both include low-voltage filament lamps shown at 5 and 3'. The compensating resistance associated with input transformer 10 is shown at 17 in series with the lamp 5.

Figure 5:
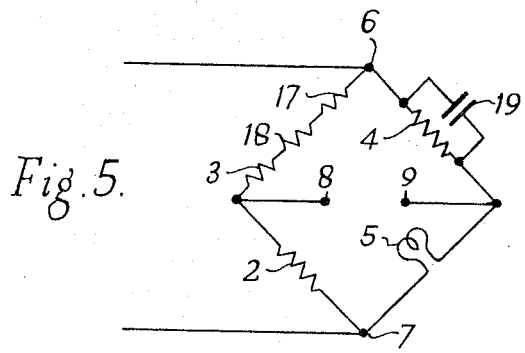
FIG. 5 shows a detail variant of the bridge arrangement of FIG. 3.

FIG. 5 shows a practical embodiment of the Wheatstone bridge arrangement with detail modifications from that of FIG. 3. In the arrangement of FIG. 5 the ohmic resistance 3 has a smaller resistance 18 in series therewith for presetting the exact value of this arm. The resistance 4 is shunted by a capacitor 19. In this arrangement, the component values are as follows:

| | |
|---|---|
| Resistance 2 | 15 ohms. |
| Resistance 3 | 470 ohms. |
| Resistance 4 | 1,000 ohms. |
| Lamp 5 | 6 volts, 0.3 amp. |
| Resistance 17 | 2.6 ohms. |
| Resistance 18 | 100 ohms. |
| Capacitor 19 | 0.01 microfarad. |

Additional embodiments of the invention in this specification will occur to others and therefore it is intended that the scope of the invention be limited only by the appended claims and not by the embodiments described hereinabove. Accordingly, reference should be made to the following claims in determining the full scope of the invention.

What I claim is:

1. A voltage-measuring circuit arrangement of the type comprising a Wheatstone bridge including a first temperature-sensitive resistance in an arm thereof, said bridge having a pair of input terminals connectably supplied with an input voltage from a step-down input transformer and having a pair of output terminals for supplying an unbalanced voltage, said bridge being balanced for a predetermined value of said input voltage, a second temperature-sensitive resistance formed thermally integrally with the step-down input transformer and included in one arm of the bridge and so dimensioned that bridge unbalance due to temperature change of the step-down input transformer is substantially compensated.

2. A voltage measuring circuit arrangement as claimed in claim 1, in which said first temperature-sensitive resistance is a filament lamp, said second temperature-sensitive resistance has the characteristic of increasing resistance with temperature and is included in the same bridge arm as said filament lamp, in series therewith.

3. A voltage measuring circuit arrangement as claimed in claim 2, in which the Wheatstone bridge includes a filament lamp in each one of a pair of opposite arms thereof.

4. A voltage measuring circuit arrangement as claimed in claim 2, in which the Wheatstone bridge includes a filament lamp in each one of a pair of opposite arms thereof and said second temperature-sensitive resistance is connected in series with one filament lamp.

5. A voltage measuring circuit arrangement as claimed in claim 4, in which the second temperature-sensitive resistance is a non-inductive winding on said step-down input transformer.

6. A voltage measuring circuit arrangement as claimed in claim 5, in which said non-inductive winding is wound from a parallel pair of copper wires, joined together at their one ends, connected in a bridge arm at their other ends and wound on the step-down input transformer between primary and secondary windings thereof.

References Cited by the Examiner

UNITED STATES PATENTS

| | | | |
|---|---|---|---|
| 2,769,134 | 10/1956 | Hookham | 322—28 |
| 3,119,060 | 1/1964 | Spector | 323—68 |

JOHN F. COUCH, *Primary Examiner.*

LLOYD McCOLLUM, *Examiner.*

A. D. PELLINEN, *Assistant Examiner.*